(No Model.) 2 Sheets—Sheet 2.
F. E. DEGENHARDT.
CONDUIT FOR ELECTRIC RAILWAYS.
No. 458,619. Patented Sept. 1, 1891.
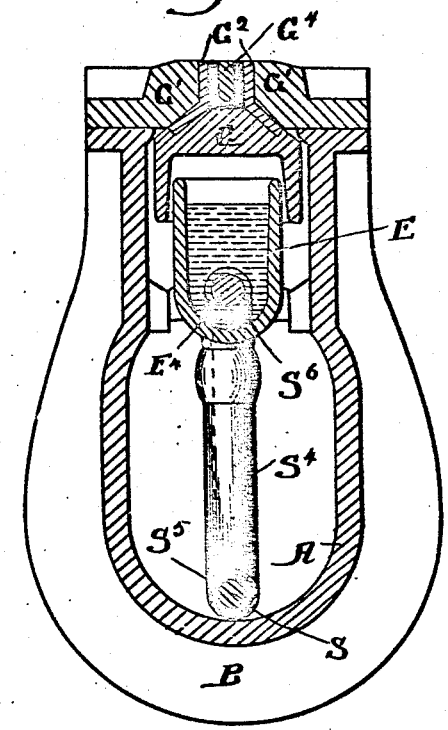
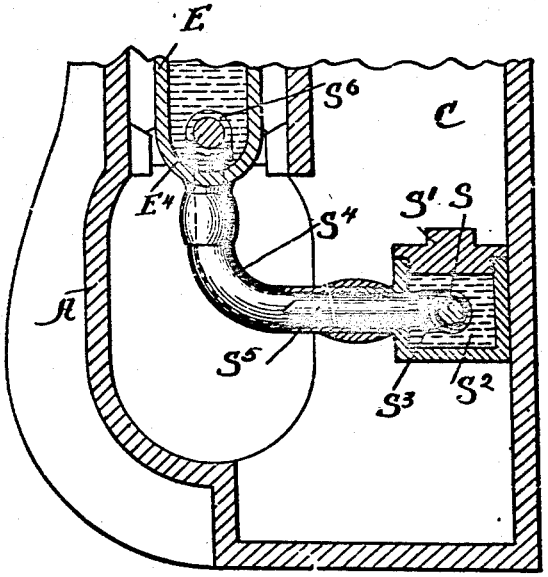
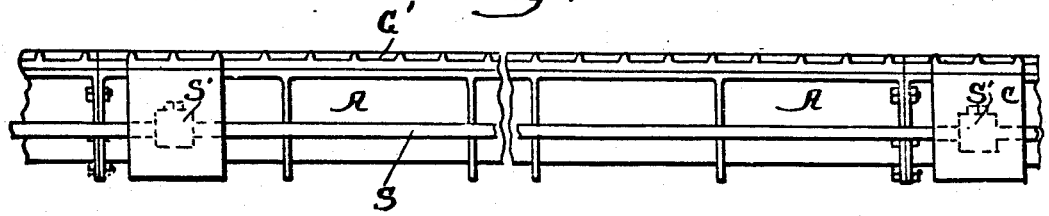
Witnesses:
Celeste P. Chapman
H. B. Hallock
Inventor:
Frederick E. Degenhardt
Francis W. Parker,
Attorney.

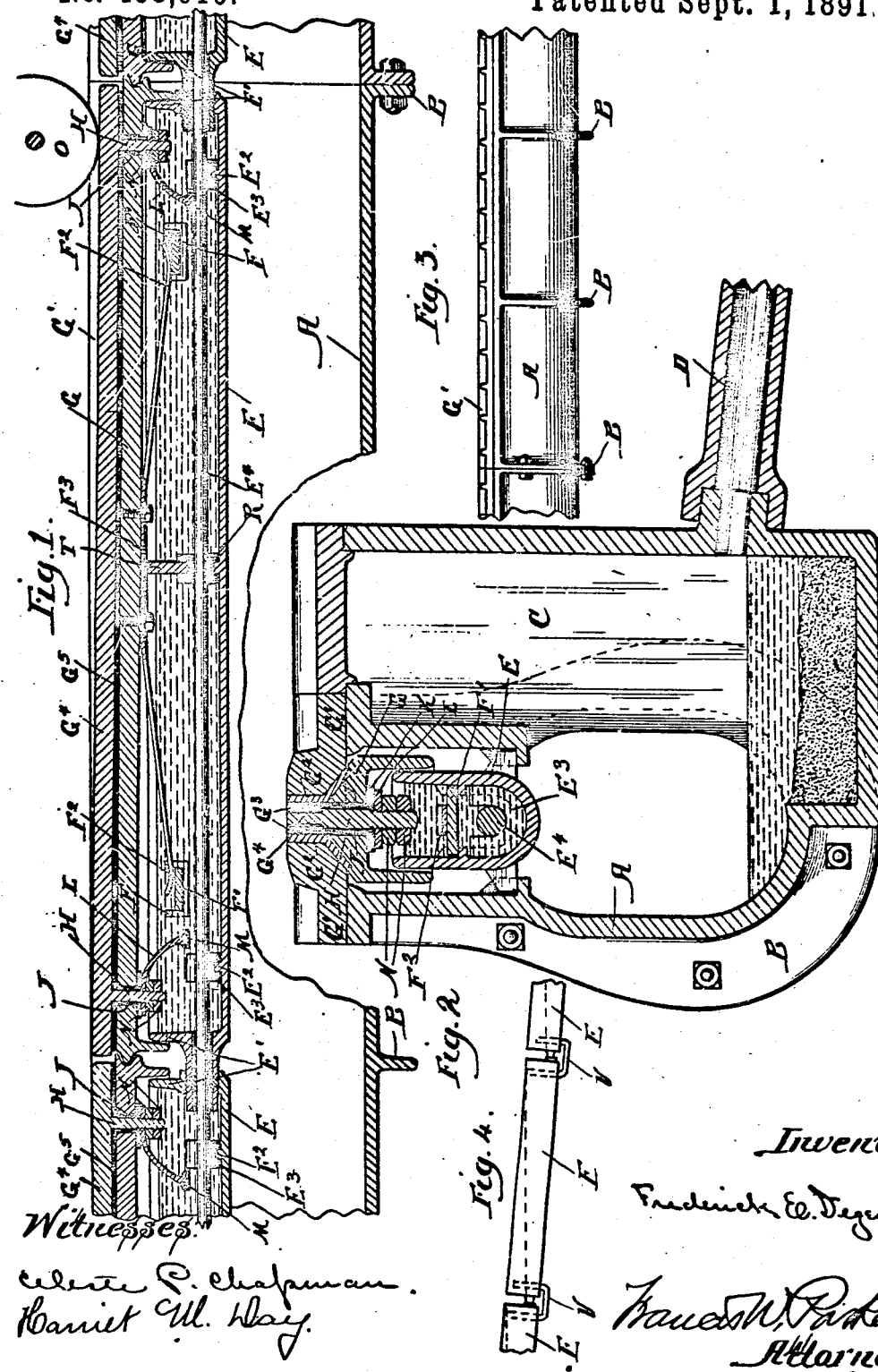

UNITED STATES PATENT OFFICE.

FREDERICK E. DEGENHARDT, OF CHICAGO, ILLINOIS.

CONDUIT FOR ELECTRIC RAILWAYS.

SPECIFICATION forming part of Letters Patent No. 458,619, dated September 1, 1891.

Application filed November 21, 1890. Serial No. 372,171. (No model.)

*To all whom it may concern:*

Be it known that I, FREDERICK E. DEGENHARDT, a citizen of the United States, residing at Chicago, in the county of Cook and State of Illinois, have invented a new and useful Improvement in Conduits for Electric Railways, of which the following is a full, clear, and exact specification.

My invention relates to improvements in conduits for electric railways and the devices therewith, and has for its object to provide convenient means for conducting the current of electricity through an insulated conductor to a moving car containing a motor. It is illustrated in the accompanying drawings, wherein—

Figure 1 is a longitudinal sectional view. Fig. 2 is a cross-section; Fig. 3, a side view of the exterior drainage-conduit, showing the strengthening-flanges and the end flanges by means of which the several sections are secured together. Fig. 4 is a detail; Figs. 5 and 6, cross-sections of conduits provided with feeder-wires, and Fig. 7 is a side view of the same.

Like parts are indicated by the same letters in all the figures.

A is an exterior drainage-conduit provided at intervals with strengthening-flanges B B, also at intervals with the boxes C C, from which lead the pipes D to the sewer or other discharging-points. Within the drainage-conduit are the sections E E, U-shaped in cross-section and provided with ends E' E', so as to form each an independent box or channel, which is filled nearly full of a heavy oil or other insulating-fluid, as indicated in the figures. Toward the ends of each of those boxes and about the bottom thereof are the arc-shaped ribs $E^2$ $E^2$, adapted to receive and hold in position the grooved insulators $E^3$ $E^3$, in which rests the continuous conductor $E^4$.

Located upon both sides of the box E and near the ends thereof are U-shaped supports F, adapted to receive from above, and thus support the transverse plates F' F', on which rest the ends $F^2$ $F^2$ of the spring-plate $F^3$, which is secured to the top or lid G of the box E. This lid is U-shaped in cross-section and adapted to fit down upon and exterior to the edges and ends of the box E, as indicated in above figures.

G' G' are the upper or surface plates, which lie above the entire conduit and approach each other, so as to form a slot, as indicated, and the lid G is provided with upwardly-inclined sides and terminates in a longitudinal rib from end to end of the lid. The sides of the lid and the sides of the rib are faced with sheets of metal $G^2$ $G^2$, which bear against similar longitudinal ribs of insulation $G^3$ $G^3$, which ribs in turn inclose a central longitudinal metallic rib $G^4$.

Beneath the insulated strips $G^3$ $G^3$ and within the surface plates $G^2$ $G^2$, and hence flat upon the body of the lid proper, is disposed the insulating-plate $G^5$, which is provided at intervals with apertures through which project the downwardly-extending pins H, in electrical connection with the insulated strip $G^4$. Each of these pins is surrounded by an insulation-sleeve J and a washer K to insulate it from the body of the cover or top G. The lower ends of such pins are screw-threaded, and on each is secured the contact-arm L, which carries the shoe M and is held in position by the nuts N N. The connection between the pin H and the arm L may be placed farther down within the box E, so as to bring all the parts beneath the surface of the oil within such hole, if the same is found to be necessary in any given case.

The details of the construction devices may be greatly changed without departing from the spirit of my invention.

The construction between the ends of the covers of the boxes and the manner of supporting the box E within the conduit A and the method of securing the conductor $E^4$ in position and insulating the same are not material to my invention.

O is the trolley-wheel, shown as having depressed one end of the box-lid, so as to bring the contact-arm L down and force its shoe M against the conductor $E^4$, so as to lead the current to the car above.

V V are U-shaped connection-pieces adapted to connect adjacent ends of boxes when the same are set on inclines or levels and so as to permit the overflow-fluid from one box to pass to the next, as illustrated in Fig. 4.

Fig. 1 shows a cross-partition T in the box or trough.

S is a feed-conductor insulated and disposed along the bottom of the conduit or along the side thereof. In the latter case it will pass through the boxes S', which contain, preferably, insulation S². From each box leads the pipe S⁴, carrying the short insulated conductor S⁵, connected by the connector S³ with a bared portion of the feed-conductor. This short wire connects also by a connector S⁶ with the conductor E⁴. In like manner a connection is made from the conductor S when in the conduit to the conductor E⁴.

The use and operation of my invention are as follows: The exterior drainage-conduit is placed in position, being strengthened by the flanges, and the several sections thereof are bolted together at their ends, as indicated, suitable packing being placed between them, so as to make a continuous drainage-conduit. This conduit is provided at intervals with the boxes or man-holes C, whereby access may be had to the interior without disturbing the box which contains the conductors. These man-holes are constructed with suitable connections with the sewer or waste pipe, so as to carry off surplus water. The drainage-conduits thus placed in position are open at the top, and the boxes E E are dropped therein in sections, being supported by arms or lugs on the boxes and ledges on the inner surface of the conduit. The conductor E⁴ is of course drawn through the connecting-apertures between the successive sections, so as to pass through the box E in the manner indicated, and the parts are suitably insulated and packed, so that there is no open connection between the successive boxes E E, except when the connections V V are used. The conductor E⁴ is supported upon the insulators E³, which insulators are dropped into position from above and rest upon the rib E². The cross-plates F' are now in like manner dropped into the U-shaped supports F. The lids are then dropped into position from above, and they rest upon the spring F³, the ends of which are supported on the plates F' F'. In this position the shoes M are not in contact with the conductor E⁴. The ends of these lids are preferably connected so as to rise and fall together, though this is not essential to the operation of my improvements. The surface plates are then suitably secured in position, and the apparatus is ready for use. A current is supplied to the conductor E⁴, and when the car passes along with a suitable trolley O in contact with the conductor E⁴ it is the intention that, as indicated in Fig. 1, the ends of the box-lids will be depressed, so as to bring the shoe M down upon and with a sliding contact against the conductor E⁴, whereupon a connection from such conductor through the shoe M, spring contact-arm L, pin H, and strip G⁴ will be made from the conductor to the motor on the car and will be insulated throughout. As the car passes on, the connection will be made at the other end of the strip, and when the car reaches the end of the strip G⁴ a contact will have been made with the next succeeding strip in the same manner, so that as the car moves along a continuous current is supplied to the motor. A very narrow slot must of necessity intervene between the opposed surfaces of the plates G² and G', and through such slot a certain amount of water or moisture will descend. This, however, will be carried down by the overhanging edges of the lid into the lower portion of the drainage-conduit, and thence will be carried to the sewer. The construction of the parts is such that when the lid is forced down the exposed surface of this upper longitudinal rib will never be below the lower extremity or margin of the sides of the slot in which it lies, and hence the only channel ever open for the descent of water and the like into the drainage-conduit will be that of the narrow slit or slot between the opposed surface of such rib and the plates G'. The cross-sectional area of such slot is so small as compared with the drainage-channel as to preclude the possibility of the latter being filled with water; but should it become so the sealing-oil—such as crude and heavy petroleum or oils known to the trade as "London" or "dead rosin"—in the boxes, being heavier than such water, will still remain in the bottom of the boxes and will protect the contacts being made with the conductor E⁴. Moreover, the upper chamber formed between the box and its lid, being nearly full of oil, will become an air-pressure chamber as soon as the water rests on the margin of the overhanging lid, and any further rise of the water will not sufficiently compress the air in the upper part of such chamber to effect the operation therein, for the slit or slot between the opposed surface of the rib and the surface-plates is so narrow in cross-section that no real column of water can exist therein and no great hydrostatic pressure can be applied therefrom, even though the entire conduit be filled with water to the surface of the street.

By using the pipe connection V to connect the various troughs they may be filled by pouring in the insulating compound at one end. The cross-partition is useful in the event of the conduit being set at an incline. By means of the feed-conductors the pressure may be distributed along the working line, as desired, in the well-known way. I have shown but one feed-conductor; but it is obvious that my devices are equally applicable to a three-wire system. In some cases it may be desirable to dispense with the advantages of having the rib within the slot, and the lid and conductor-carrying boxes may then be disposed below such slot within the conduit. The box S' may be placed in the man-holes or elsewhere, as desired, and the feed conductor or conductors may be protected in any desired way.

I claim—

1. In a conduit for street-railways, the combination of successive sections of drainage-conduits independently secured together at their ends with successive sections of covered conductor-carrying boxes or conduits closed on their upper sides and supported within such drainage-conduit.

2. In a conduit for street-railways, the combination of successive sections of drainage-conduits independently secured together at their ends with successive sections of conductor-carrying boxes or conduits supported within such drainage-conduits, such conductor-supporting boxes being upwardly open and provided with covers having overhanging edges.

3. In a conduit for street-railways, the combination of successive sections of drainage-conduits independently secured together at their ends with successive sections of conductor-carrying boxes or conduits supported within such drainage-conduit, such conductor-supporting boxes being upwardly open and provided with covers having overhanging edges and containing each a quantity of insulating-liquid, beneath the surface of which lies the conductor.

4. In a conduit for electric railways, the combination of an exterior drainage-conduit having a narrow longitudinal slot above with vertically-moving contact-making pieces, which move in and substantially fill such slot at all times, whether depressed or elevated, and a conducting-wire adapted to be contacted by such contact-making pieces.

5. In a conduit for electric railways, the combination of an exterior drainage-conduit with conductor-carrying conduits or boxes supported therein, and moving covers for said boxes, carrying conductors to engage the conductor, said exterior conduit provided with a narrow longitudinal slot above, the said covers provided with longitudinal ribs closely fitting and always within such slot.

6. In a conduit for electric railways, the combination of successive conductor-carrying boxes or conduits provided with ribs therein, and grooved insulators adapted to rest upon said ribs and to support the conductor within such box.

7. In an electric street-railway, the combination of successive conductor-carrying conduits or boxes, each provided with side brackets or supports within, and transverse plates to rest upon said brackets and receive the ends of the spring lid-supports.

8. In a conduit for street-railways, the combination of a conduit provided with a narrow slot above with a moving part having a rib within such slot, said rib consisting of exterior surface plates and an interior conducting-plate surrounded by insulation, and a conductor and contacting parts connected with such conducting-plate, so that when the latter is depressed in the slot it is electrically in contact with the conductor.

9. In a conduit for electric street-railways, the combination of a series of boxes in which the conductor is disposed with a series of lids, one for each of said boxes, said lids provided each with an upper rib having an insulated longitudinal conducting-section and with contactors projecting into such boxes, so that when the lid is depressed the rib is in connection with the conductor.

10. In a conduit for electric street-railways, the combination of a series of boxes in which the conductor is disposed with a series of lids, one for each of said boxes, said lids provided each with an upper rib having an insulated longitudinal conducting-section and with contactors projecting into such boxes, so that when the lid is depressed the rib is in contact with the conductor and a quantity of insulating-liquid in such boxes, so that the contacts are made beneath the surface of the liquid.

11. In a conduit for electric street-railways, the combination of a series of conductor-carrying boxes end to end and containing insulating-liquid with connecting U-shaped pipes which open into the upper parts of adjacent ends of such boxes.

12. In a conduit for electric street-railways, the combination of a series of conductor-carrying boxes end to end, with insulating-liquid therein, and a series of partitions T therein.

13. In a conduit for electric street-railways, the combination of a series of conductor-carrying boxes end to end, with insulating-liquid therein, and a feed-conductor disposed along such boxes and connected at intervals with the working conductor therein.

14. In a conduit for electric street-railways, the combination of a series of conductor-carrying boxes end to end, with insulating-liquid therein, and a feed-conductor disposed along such boxes and connected at intervals with the working conductor therein, such connection being made by a short wire and the points of its engagement with the conductors to be connected being beneath the surface of an insulating-fluid.

FREDERICK E. DEGENHARDT.

Witnesses:
CELESTE P. CHAPMAN,
HARRIET M. DAY.